United States Patent
Xu (10) Patent No.: US 11,903,067 B2
(45) Date of Patent: Feb. 13, 2024

(54) AUDIO FORWARDING METHOD, DEVICE AND STORAGE MEDIUM

(71) Applicant: Nanjing Zgmicro Company Limited, Jiangsu (CN)

(72) Inventor: Bin Xu, Nanjing (CN)

(73) Assignee: Nanjing Zgmicro Company Limited, Jiangsu (CN)

( * ) Notice: Subject to any disclaimer, the term of this patent is extended or adjusted under 35 U.S.C. 154(b) by 120 days.

(21) Appl. No.: 17/849,079

(22) Filed: Jun. 24, 2022

(65) Prior Publication Data

US 2022/0418023 A1    Dec. 29, 2022

(30) Foreign Application Priority Data

Jun. 25, 2021 (CN) .......................... 202110710117.9

(51) Int. Cl.
| | |
|---|---|
| *H04W 76/15* | (2018.01) |
| *H04W 4/80* | (2018.01) |
| *H04R 3/00* | (2006.01) |

(52) U.S. Cl.
CPC .............. *H04W 76/15* (2018.02); *H04R 3/00* (2013.01); *H04W 4/80* (2018.02); *H04R 2420/07* (2013.01)

(58) Field of Classification Search
CPC ....... H04W 76/15; H04W 4/80; H04W 84/18; H04W 76/14; H04W 8/24; H04W 80/02; H04R 3/00; H04R 2420/07; H04R 3/12; Y02D 30/70

USPC .......................................................... 455/41.3
See application file for complete search history.

(56) References Cited

U.S. PATENT DOCUMENTS

| | | | |
|---|---|---|---|
| 7,873,064 B1* | 1/2011 | Li ...................... | G10L 19/005 |
| | | | 704/200 |
| 10,715,985 B2* | 7/2020 | Huang .................... | H04W 4/80 |
| 2016/0171990 A1* | 6/2016 | Reuschl ................. | G10L 21/04 |
| | | | 704/503 |
| 2017/0188092 A1* | 6/2017 | Lawrence ........ | H04N 21/43615 |
| 2019/0005969 A1* | 1/2019 | Dick ..................... | G10L 19/008 |

* cited by examiner

*Primary Examiner* — Eugene Yun
(74) *Attorney, Agent, or Firm* — Joe Zheng (57) ABSTRACT

An audio forwarding method, an audio forwarding method device and a storage medium are described. The audio forwarding method comprises: establishing a first communication link with a sound source device based on a first wireless communication protocol; establishing a second communication link with an audio playback device based on a second wireless communication protocol; receiving first audio data from the sound source device through the first communication link; processing the first audio data to generate second audio data, and storing the second audio data into a second buffer; and transmitting the second audio data to the audio playback device through the second communication link. The second audio data in the second buffer is acquired according to a predetermined encoding frame length, a current frame is processed as an empty data frame if the second audio data in the second buffer is not successfully acquired, and an audio data packet containing the empty data frame is transmitted or not transmitted to the audio playback device through the second communication link within a current transmission time.

14 Claims, 5 Drawing Sheets

AUDIO FORWARDING METHOD, DEVICE AND STORAGE MEDIUM

BACKGROUND OF THE INVENTION

Field of the Invention

The present invention relates to the field of wireless audio technology, in particular to an audio forwarding method, an audio forwarding device and a storage medium.

Description of the Related Art

Wireless audio technology brings people unfettered free calls and music enjoyment, and is popularly enjoyed by people. In particular, the wireless audio technology based on classic Bluetooth technology has been widely used in the fields of computers, smart phones, smart speakers, smart headphones, and in-vehicle equipment. In order to further improve the quality of wireless audio, supports in true wireless stereos (TWS) function and broadcast audio function, and reduction in power consumption, complexity and cost, have helped develop Bluetooth low energy (BLE) audio technology, where a connected isochronous stream (CIS) protocol and a connected isochronous group (CIG) protocol, a broadcast isochronous stream (BIS) protocol and a broadcast isochronous group (BIG) protocol are now supported.

There is at least, however, a compatibility problem between a BLE audio receiving device and a classic BT audio source device. In order to solve the compatibility problem, a forwarding device needs to be disposed between the classic BT audio source device and the BLE audio receiving device. Since the classic BT audio forwarding device adopts asynchronous communication, in the environment of interference and fading, some audio data needs to be retransmitted several times in order to be received correctly. In addition, the classic BT audio source devices, especially smartphones, have multitasking conflicts, which also randomly cause audio data transmission delays.

Therefore, it is necessary to propose an improved technical scheme to solve the above problems.

SUMMARY OF THE INVENTION

One purpose of the present invention is to provide an audio forwarding method, an audio forwarding device and a storage medium, to solve delay problem in real-time transmission of wireless audio.

To achieve the purpose, according one aspect of the present invention, an audio forwarding method is provided. The audio forwarding method comprises: establishing a first communication link with a sound source device based on a first wireless communication protocol; establishing a second communication link with an audio playback device based on a second wireless communication protocol; receiving first audio data from the sound source device through the first communication link; processing the first audio data to generate a second audio data, and storing the second audio data into a second buffer; and transmitting the second audio data to the audio playback device through the second communication link. The second audio data in the second buffer is acquired according to a predetermined encoding frame length, a current frame is processed as an empty data frame if the second audio data in the second buffer is not successfully acquired, and an audio data packet containing the empty data frame is transmitted or not transmitted to the audio playback device through the second communication link within a current transmission time.

According another aspect of the present invention, an audio forwarding device is provided. The audio forwarding device comprises: a dual-mode radio frequency transceiver configured for establishing a first communication link with an audio source device based on a first wireless communication protocol, establishing a second communication link with an audio playback device based on a second wireless communication protocol, receiving first audio data from the audio source device through the first communication link; an audio processing unit configured for processing the first audio data to generate a second audio data, storing the second audio data into a second buffer, and acquiring the second audio data in the second buffer according to a predetermined encoding frame length, processing a current frame as an empty data frame if the second audio data in the second buffer is not successfully acquired; a baseband data and protocol processor configured for transmitting or not transmitting an audio data packet containing the empty data frame to the audio playback device through the second communication link within a current transmission time.

One of the objectives, advantages and benefits in the present invention is to ensure time continuity of audio data and reduce audio transmission delay caused by randomness of wireless communication.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF THE PREFERRED EMBODIMENTS

The detailed description of the invention is presented largely in terms of procedures, operations, logic blocks, processing, and other symbolic representations that directly or indirectly resemble the operations of data processing devices that may or may not be coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be comprised in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

An audio forwarding method provided according to one embodiment of the present invention will be described in detail below with reference to the accompanying drawings through specific embodiments and application scenarios. The audio forwarding method can be used to an audio forwarding device, an audio communication system, and the like.

Figure 1:
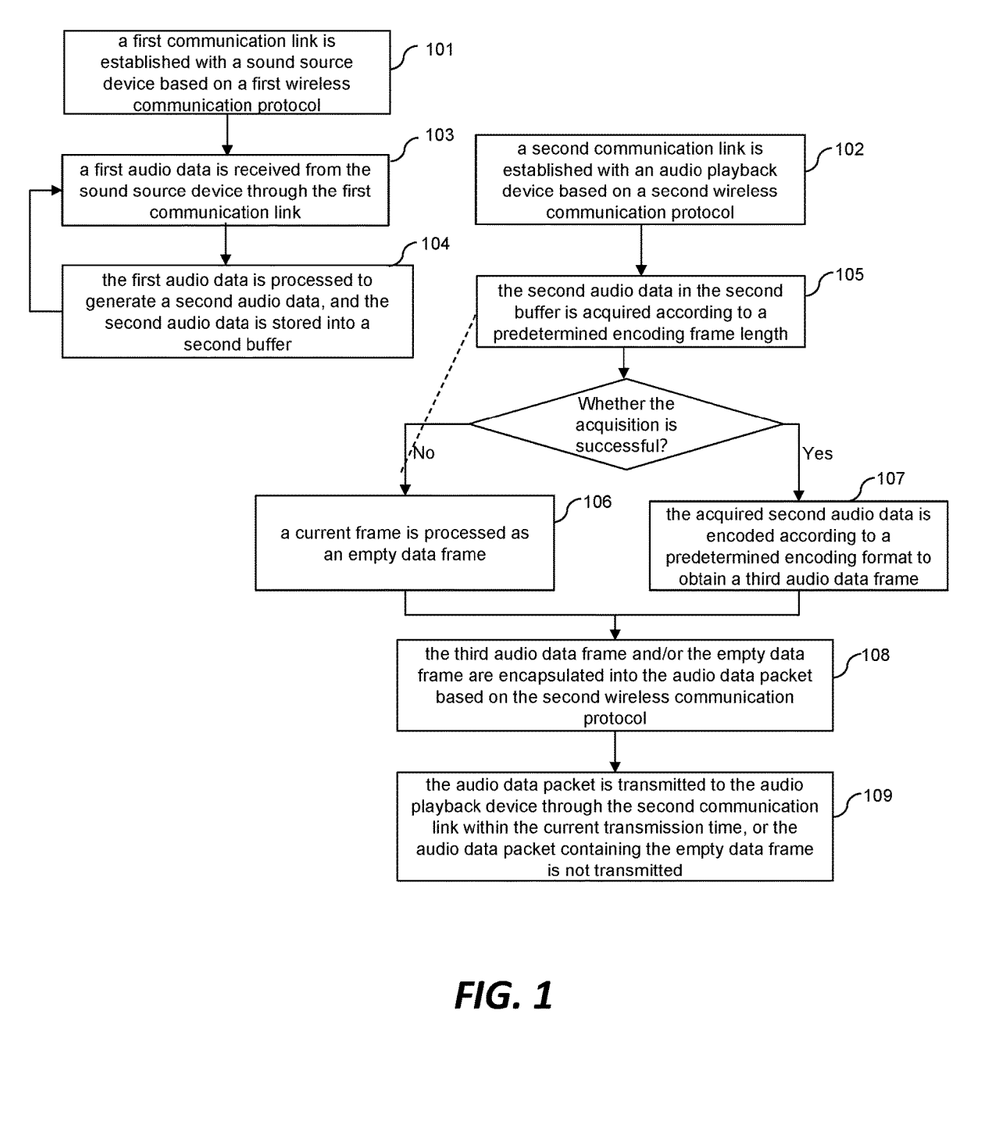
FIG. 1 is a flowchart of an audio forwarding method according to one embodiment of the present invention.

FIG. 1 is an example flowchart of an audio forwarding method according to one embodiment of the present invention. The audio forwarding method comprises the following operations.

At 101, a first communication link is established with a sound source device based on a first wireless communication protocol. Specifically, by establishing the first communication link with the sound source device, an audio data transmitted by the sound source device can be received. For example, the sound source device may be a mobile phone, a computer, a tablet computer and/or a smart TV. The audio data transmitted from the sound source device can be received though the first communication link.

At 102, a second communication link is established with an audio playback device based on a second wireless communication protocol. For example, the audio playback device may be earphones, speakers, and the like. The audio data to be played is transmitted to the audio playback device through the second communication link. It can be understood that an execution order of two operations 101 and 102 may be determined according to specific implementation scenarios, and the present invention does not specifically limit the execution order of the two operations.

At 103, first audio data is received from the sound source device through the first communication link. At 104, the first audio data is processed to generate a second audio data, and the second audio data is stored into a second buffer. In one embodiment, the received first audio data is stored into a first buffer, the first audio data stored in the first buffer is processed to generate the second audio data when the first audio data in the first buffer reaches a first threshold, and the second audio data is stored into the second buffer.

The processing of the first audio data stored in the first buffer comprises decoding the first audio data, and/or resampling the first audio data if a sampling rate conversion is required, generating and buffering the second audio data according to the processed first audio data. It can be understood that the operations 101, 103 and 104 are the processes of receiving and storing the first audio data though the first communication link and obtaining the second audio data. During the communication process, after the operation 104 is executed, it will return to the operation 103 to continue to receive the first audio data subsequently transmitted by the audio source device until the communication is terminated, or the audio source device stops transmitting the first audio data.

Operations 105 to 109 shown in FIG. 1 are process of transmitting the second audio data to the audio playback device, that is, the process of forwarding the audio data provided by the sound source device to the audio playback device. At 105, the second audio data in the second buffer is acquired according to a predetermined encoding frame length. The predetermined encoding frame length may be an encoding frame length of data frames supported by the second communication link.

At 106, a current frame is processed as an empty data frame if the second audio data in the second buffer is not successfully acquired, that is, the acquisition fails. In the conventional technology, if the first threshold is set to a small value, when the first audio data is received, randomness or burstiness caused by the interference environment of the wireless communication will occasionally cause large delay, which will lead to acquisition failure when acquiring the second audio data in the second buffer during the encoding frame length of the second communication link. Therefore, in the conventional technology, increasing the first threshold, that is, increasing the buffer, is usually adopted to combat the randomness or burstiness of the audio data transmission. However, the larger the buffer is, the larger the audio transmission delay is, which is difficult to meet audio application scenarios with high real-time requirements. At this time, in the embodiment of the present invention, there is no need to increase the first threshold (i.e., increase the buffer), but the current frame is processed as the empty data frame when the acquisition fails.

It is worth noting that, in addition to the above situations that may cause the acquisition failure of the second audio data, the situations that may cause the acquisition failure also comprises: the first audio data is not successfully transmitted because the sound source device fails to transmit after multiple retransmissions or the audio data buffer is refreshed due to other tasks occupying time slots, and the audio forwarding device actively replies a correct reception confirmation information to prevent multiple retransmissions which results in that the first audio data is not correctly received by the audio forwarding device and then results in that the second audio data is empty.

Due to the above-mentioned various reasons, serial numbers of the received first audio data are discontinuous, so that the second audio data generated according to the first audio data also has discontinuous serial numbers. Therefore, the audio data with discontinuous serial numbers is acquired according to the encoding frame length of the second communication link which is also considered that the acquisition fails, and then the current frame is processed as the empty data frame at this time.

At 107, the acquired second audio data is encoded according to a predetermined coding format to obtain a third audio data frame if the second audio data in the second buffer is successfully acquired, namely, the acquisition succeeds. The third audio data frame meets requirements of the data format supported by the second communication link, and can be transmitted to the audio playback device through the second communication link to realize audio playback.

At 108, the third audio data frame and/or the empty data frame are encapsulated into the audio data packet based on the second wireless communication protocol. In operations 105-107, after the current frame is processed as the empty data frame or the third data frame, the empty data frame and/or the third data frame is stored in the third buffer. The empty data frame and/or the third data frame in the third buffer are encapsulated into the audio data packet when the number of data frames of the empty data frame and/or the third data frame in the third buffer meets a transmission threshold.

It can be understood that the transmission threshold refers to the number of audio data frames that need to be transmitted within the current transmission time. For example, in the case of a wireless communication protocol based on Bluetooth low energy communication technology, the transmission threshold is the number of audio data frames that need to be transmitted in one isochronous interval. For example, one audio data frame need to be transmitted in one isochronous interval, and the transmission threshold is 1.

At 109, the audio data packet is transmitted to the audio playback device through the second communication link within the current transmission time, or the audio data packet containing the empty data frame is not transmitted. For example, when the second communication protocol is a wireless communication protocol based on the Bluetooth low energy communication technology, the audio data packets are transmitted to the audio playback device at isochronous intervals within the transmission time of the isochronous stream.

In one embodiment, the audio data packet is transmitted to the audio playback device through the second communication link within the current transmission time. In this embodiment, one or more audio data packets are transmitted to the audio playback device after each transmission time arrives. After the audio data packet is received, the audio playback device can eliminate impact caused by packet loss by using packet loss concealment (PLC) technology when the audio data packet contains the empty data frame.

In another embodiment, when the audio data packet does not contain the empty data frame, the audio data packet is transmitted to the audio playback device through the second communication link in the current transmission time. When the audio data packet contains the empty data frame, the audio data packet is not transmitted. In this embodiment, when the audio playback device does not receive the audio data packet, the audio playback device can eliminate the impact caused by packet loss by using packet loss concealment (PLC) technology.

Through the operations 101-109, the audio data packet can be forwarded to the audio playback device within the current transmission time, and the audio transmission delay caused by the randomness of wireless communication can be reduced by transmitting the empty audio data packet or not transmitting the audio data packet when the audio data is missed.

Figure 2:
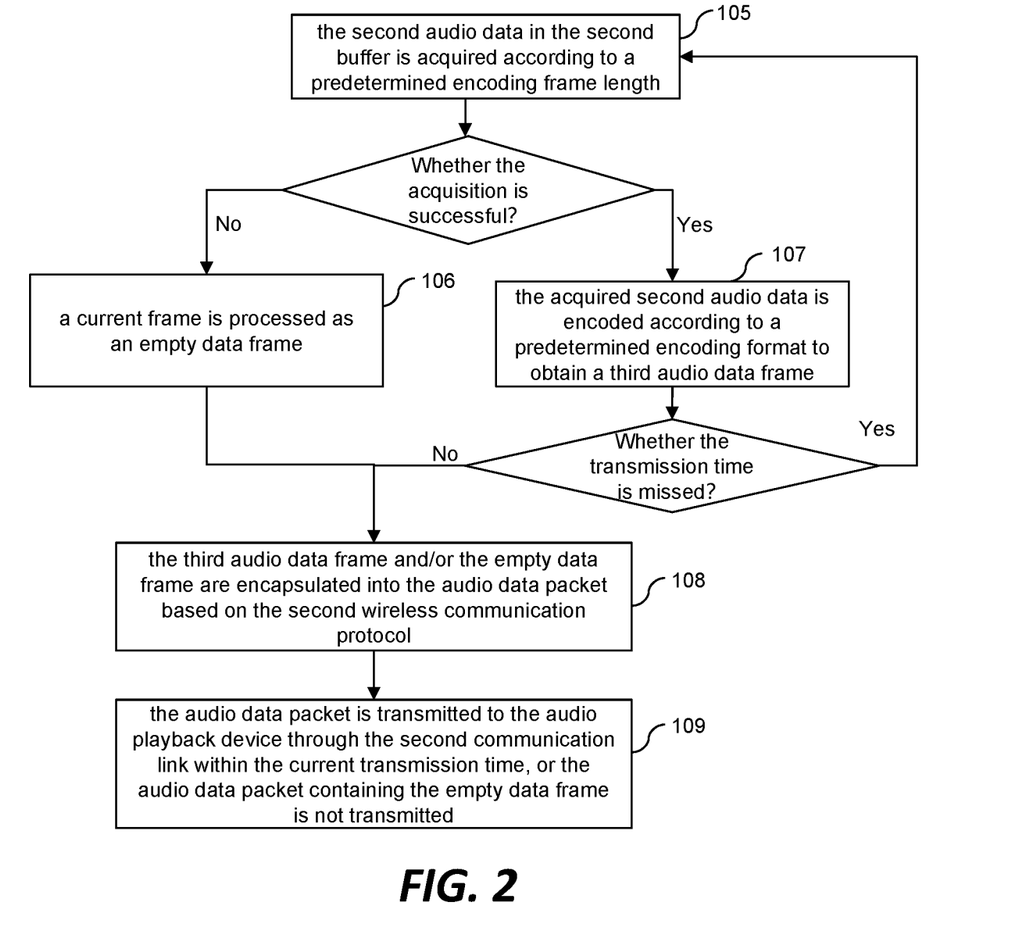
FIG. 2 is a flowchart of another audio forwarding method according to another embodiment of the present invention.

Optionally, referring to the flowchart shown in FIG. 2, if the acquisition is successful, after the acquired second audio data is encoded according to the predetermined coding format to obtain the third audio data frame, the audio forwarding method comprises: the third audio data frame is discarded if the third audio data frame is the audio data frame that has missed the transmission time.

Figure 6:
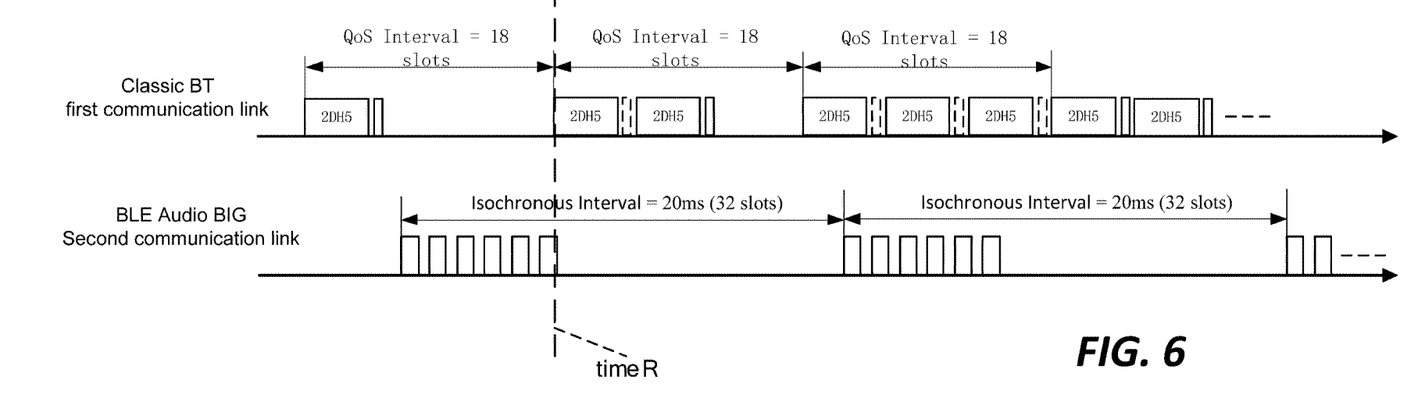
FIG. 6 is a schematic time slot diagram of first and second communication links according to one embodiment of the present invention.

Referring to FIG. 6, for example, the third audio data frame $p_t$ should be the audio data frame transmitted at time t, but the current transmission time has reached time t+1. Therefore, the third audio data frame $p_t$ is discarded because the third audio data frame $p_t$ is the audio data frame that has missed the transmission time. Then, the second audio data that should be transmitted at time t+1 is acquired, the acquired second audio data is encoded according to the coding format of the second communication link to generate the three audio data frame $p_{t+1}$. In this embodiment, the transmission time is determined for each acquired third audio data frame, and the third audio data frame that has missed the transmission time is discarded.

Through the above operations, the empty data frame and/or the third audio data frame are stored in the third buffer. If the third audio data frame needs to be stored, it is necessary to determine the transmission time of the third audio data frame, and only the third audio data frame that has not missed the transmission time is stored. When the number of the empty data frames and/or the third audio data frames in the third buffer meets the transmission threshold, all the data frames in the third buffer are encapsulated as one or more audio data packets, and then one or more audio data packets are transmitted to the audio playback device through the second communication link within the current transmission time based on the second communication protocol. The above method reduces the audio transmission delay caused by the randomness of wireless audio communication by transmitting the empty data frame, and discards the audio data frame that has missed the transmission time to ensure the time continuity of the audio data.

In one embodiment, the first wireless communication protocol is a wireless communication protocol based on the classic Bluetooth communication technology. The second wireless communication protocol is a wireless communication protocol based on Bluetooth low power communication technology. The first communication link is a classic Bluetooth audio link. The second communication link is a Bluetooth low-power broadcast isochronous group link or a Bluetooth low-power connection isochronous group link. Both the audio forwarding device and the audio playback device used to perform the above operations support Bluetooth low-power audio technology. The audio forwarding device communicates with the audio source device and the audio playback device through the first communication link and the second communication link respectively in time sharing. The audio forwarding device communicates with the sound source device within the transmission and receiving time slot of the first communication link and receives the first audio data. The audio forwarding device communicates with the audio playback device within isochronous intervals of the second communication link, and transmits the audio data packet within transmission time slots of the isochronous interval.

When the audio playback device, such as a BLE Audio receiving device, receives the empty data frame or does not receive the audio data packet, the packet loss concealment technology (PLC) can be used to eliminate the impact caused by packet loss. In the prior art, in case of time slot conflict or communication interference, the audio forwarding device needs to wait for a long time. Usually, it needs to wait for all the data to arrive before forwarding, which will lead to high delay. However, in the embodiment of the present invention, controllability of forwarding time can be ensured by transmitting the empty packets during forwarding, which can effectively reduce the transmission delay compared with the prior art.

Therefore, the above audio forwarding method provided by the present invention can support to forward wireless audio, such as classic BT audio, to a Bluetooth low energy playback device, and reduce the audio transmission delay caused by the randomness of wireless communication, such as classic BT audio communication.

Figure 3:
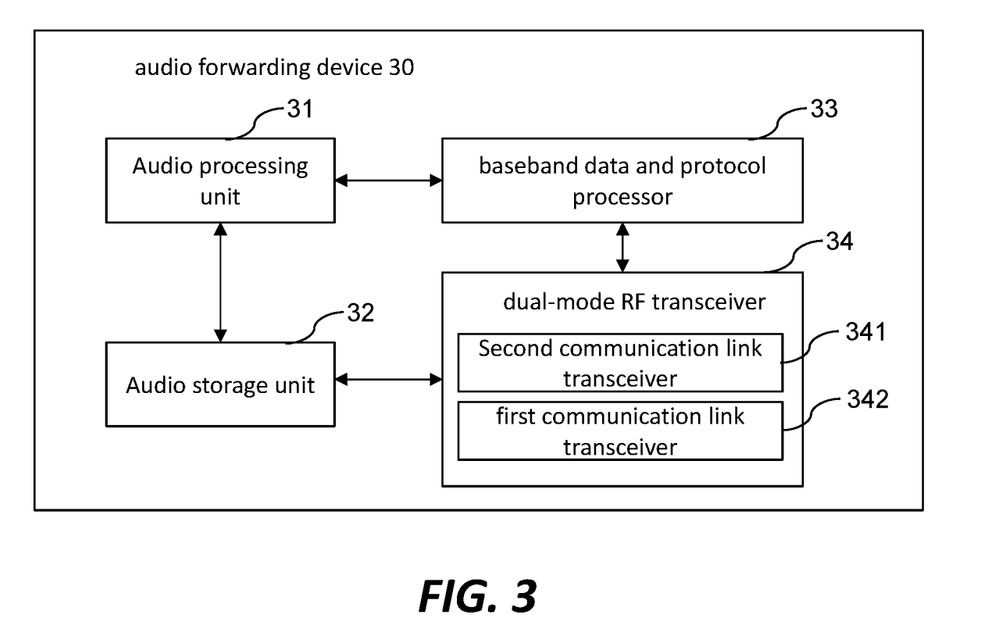
FIG. 3 is a schematic structural diagram of an audio forwarding device according to one embodiment of the present invention.

FIG. 3 is a schematic structural diagram of an audio forwarding device according to one embodiment of the present invention. Referring to FIG. 3, the audio forwarding device 30 comprises an audio processing unit 31, an audio storage unit 32, a baseband data and protocol processor 33 and a dual-mode radio frequency (RF) transceiver 34. The dual-mode radio frequency transceiver 34 is configured for establishing a first communication link with an audio source device based on a first wireless communication protocol, establishing a second communication link with an audio playback device based on a second wireless communication protocol, and receiving first audio data from the audio source device through the first communication link.

The audio processing unit 31 is configured for processing the first audio data to generate a second audio data, storing the second audio data into a second buffer, and acquiring the second audio data in the second buffer according to a predetermined encoding frame length, and processing a current frame as an empty data frame if the second audio data in the second buffer is not successfully acquired, that is, the acquisition fails. The baseband data and protocol processor 33 is configured for transmitting or not transmitting an audio data packet containing the empty data frame to the audio playback device through the second communication link within a current transmission time.

In one embodiment, the audio processing unit 31 is further configured for: acquiring the second audio data in the second buffer according to the predetermined encoding frame length, encoding the acquired second audio data according to a predetermined coding format to obtain a third audio data frame if the second audio data in the second buffer is successfully acquired, and encapsulating the third audio data frame and/or the empty data frame into the audio data packet based on the second wireless communication protocol.

In one embodiment, the baseband data and protocol processor is further configured for controlling the dual-mode radio frequency transceiver 34 to transmit the audio data packet to the audio playback device through the second communication link within the current transmission time; or controlling the dual-mode radio frequency transceiver 34 to transmit the audio data packet to the audio playback device through the second communication link within the current transmission time when the audio data packet does not contain the empty data frame, and not to transmit the audio data packet within the current transmission time when the audio data packet contains the empty data frame.

After the acquired second audio data is encoded according to the predetermined coding format to obtain the third audio data frame, the audio processing unit 31 is further configured for: discarding the third audio data frame if the third audio data frame is the audio data frame that has missed the transmission time. The audio storage unit 32 is configured to store the empty data frame and/or the third audio data frame into the third buffer. When the data frame in the third buffer meets the transmission threshold, the audio processing unit 31 encapsulates the data frame in the third buffer into the audio data packet.

In one embodiment, the dual-mode RF transceiver 34 comprises a first communication link transceiver 341 configured for communicating with the sound source device through the first communication link to receive the first audio data through the first communication link. The dual-mode RF transceiver 34 further comprises a second communication link transceiver 342 configured for communicating with the audio playback device through the second communication link to forward the audio data from the sound source device to the audio playback device through the second communication link.

In another embodiment, the dual-mode RF transceiver 34 is provided with a RF transceiver unit. The audio forwarding device multiplexes the RF transceiver unit to communicate with the audio source device and the audio playback device through the first communication link and the second communication link respectively in time sharing. In one embodiment, the first wireless communication protocol is a wireless communication protocol based on classic Bluetooth communication technology, and the first communication link is a classic Bluetooth wireless communication link. The second wireless communication protocol is a wireless communication protocol based on Bluetooth low energy communication technology, and the second communication link is a Bluetooth low energy broadcast isochronous group link or a Bluetooth low energy connected isochronous group link. The audio forwarding device provided according to one embodiment of the present invention achieves the same technical effect as the audio forwarding method provided according to one embodiment of the present invention, which will not be repeated here.

Figure 4:
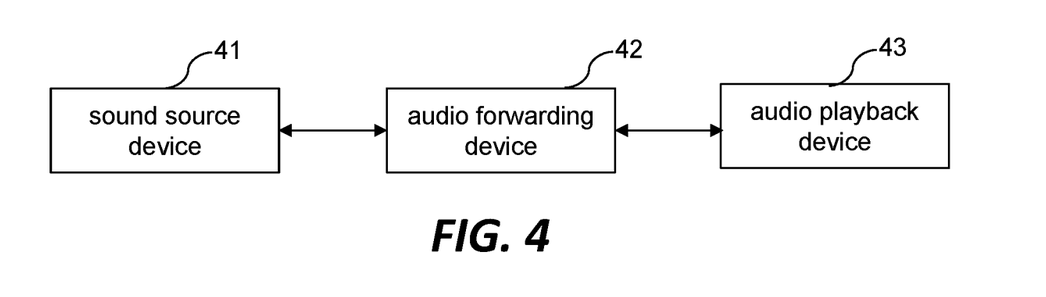
FIG. 4 is a schematic structural diagram of a communication system according to one embodiment of the present invention.

FIG. 4 is a schematic structural diagram of a communication system according to one embodiment of the present invention. Referring to FIG. 4, the communication system comprises a sound source device 41, an audio forwarding device 42, and an audio playback device (namely audio receiving device) 43. The sound source device may be a wireless sound source device based on the classic Bluetooth audio transmission technology, such as a smart phone, a computer, a tablet computer, and the like. The audio playback device 43 may be one or multiple, and the audio playback device 43 may be a Bluetooth low energy (BLE) audio receiving device, such as a wireless headset, a wireless audio device, and the like.

The audio playback device 43 receives the audio data in BLE audio coding format through the second communication link, such as Bluetooth Low Energy Broadcast Isochronous Group (BLE-BIG) link or Bluetooth Low Energy Connected Isochronous Group (BLE-CIG) link. The audio forwarding device 42 receives the audio data in the coding format of the first communication link transmitted by the sound source device through the first communication link, such as the classic BT link, decodes, resamples and/or recodes it into the audio data in the coding format of the second communication link, and then forwards it to the audio playback device 43 through the second communication link, such as BLE-CIG link or BLE-BIG link, so as to realize forwarding and playback of the audio data.

Figure 5:
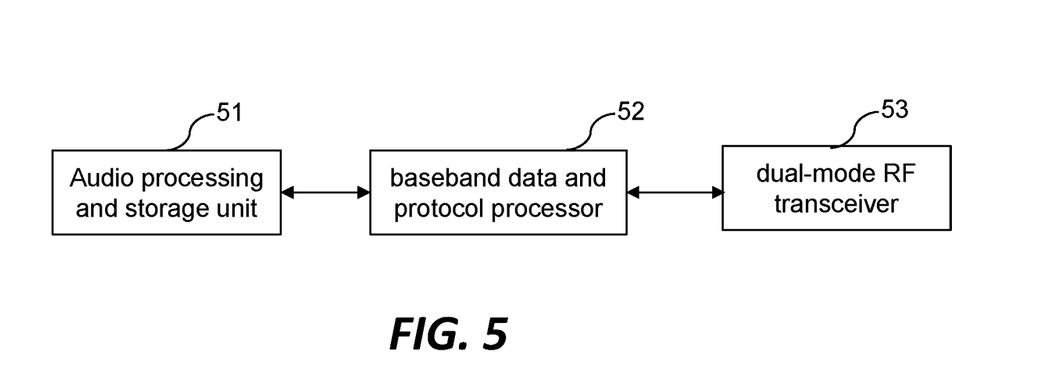
FIG. 5 is a schematic diagram of the audio forwarding device according to another embodiment of the present invention.

FIG. 5 is a schematic diagram of the audio forwarding device according to one embodiment of the present invention. Referring to FIG. 5, the audio forwarding device comprises an audio processing and storage unit 51, a baseband data and protocol processor 52, and a dual-mode radio frequency (RF) transceiver 53. The dual-mode radio frequency transceiver comprises a first radio frequency (e.g., classic BT) transceiver unit/function and a second radio frequency (e.g., BLE) transceiver unit/function. The dual-mode radio frequency transceiver 53 may be composed of a first radio frequency transceiver unit and a second radio frequency transceiver unit that are independent from each other to provide the first radio frequency transceiver function and the second radio frequency transceiver function respectively. Of course, in one embodiment, the dual-mode transceiver may also use one radio frequency transceiver to implement time-division communication in a time-division multiplexing manner. The baseband data and protocol processor 52 performs the first wireless communication protocol and the second wireless communication protocol and the audio forwarding function. The audio processing and storage unit 51 performs a first radio frequency decoding function, a sampling rate conversion function, a second radio frequency encoding function, and a function of caching audio data.

A First Example of the Audio Forwarding Method in the Present Invention

In order to further understand the audio forwarding method provided in the present invention, the audio forwarding method is further described below with a first example. In the first example, the first communication link is a classic BT link based on the classic Bluetooth communication technology, and the second communication link is a BLE BIG link based on the Bluetooth low energy communication technology, the dual-mode RF transceiver of the audio forwarding device provides a classic BT transceiver function and a BLE transceiver function by sharing the RF transceiver unit.

In the first example, the sound source device is a classic BT sound source device, and the audio playback device is a BLE audio playback device. The classic BT sound source device acts as a master device in the first communication link, and the audio forwarding device acts as a slave device in the first communication link. The audio forwarding device acts as a master device of the second communication link, and the audio playback device acts as a slave device in the second communication link.

A classic BT audio based on classic Bluetooth communication technology transmitted in the first communication link adopts a Sub-Band Coding (SBC), a sampling rate of 44.1 kHz, and a stereo coding rate of 328 kbps. The BLE audio based on Bluetooth low-power communication technology transmitted in the second communication link adopts a BIG link with a number of BIS of 1, a sampling rate of 48 Khz, a low complexity communication codec (LC3), a mono audio coding rate of 96 kbps, and a stereo coding rate of 192 kbps. A LC3 coding interval of the BLE audio is 10 ms. Left and right channels are placed in the same service data unit (SDU), with a size of 240 bytes.

As shown in FIG. 6, it is a time slot structure of the classic BT link and the BLE BIG link. The classic BT link uses a 2DH5 packet type to transmit SBC-encoded audio data, and a QoS Interval is 18 time slots, that is, 11.25 ms.

Referring to FIG. 6, each 2DH5 block in the first communication link represents one audio data packet transmitted by the classic BT sound source device. These audio data packets contain the first audio data. A small bar after each 2DH5 block represents a confirmation packet replied by the audio forwarding device. The solid small bar indicates that the audio forwarding device has replied to the confirmation packet, and the dotted small bar indicates that the audio forwarding device does not receive the audio data packet of the classic BT link and does not reply the confirmation packet due to the time slot conflict when the audio forwarding device receives the first audio data.

In the second communication link, namely, the BLE BIG link in the first example, a rate is 2 Mbps, an isochronous interval is 20 ms, a number of Sub-Events (NSE) is 6, and a burst number (BN) is 2, an Immediate Repetition Count (IRC) is 3, and a Pre-Transmission Offset (PTO) is 0. As shown in FIG. 6, a total of 6 audio packets are transmitted in one isochronous interval through the BLE BIG link. As shown in FIG. 6, since a time division multiplexing method is used to share the RF transceiver unit, the transmission time slot of the BLE BIG link will conflict with the transmission and receiving time slot of the classic BT link, which will result in the audio data packet transmitted by the classic BT sound source device through the first communication link cannot be received by the audio forwarding device in time, and will result in a delay in the reception of the first audio data. In addition, the audio forwarding device may delay the reception of audio packets in the classic BT link due to interference in the communication environment.

Combined with the audio forwarding process shown in FIG. 2, the audio forwarding device establishes a classic BT link with the classic BT sound source device, and establishes a BLE BIG link with NUM_BIS of 1 with the BLE audio playback device. The first audio data encoded by the classic BT SBC with a sampling rate of 44.1 kHz (or 48 kHz) is received through the classic BT link and stored in the first buffer. When the first audio data in the first buffer reaches the first threshold, for example, the first threshold is 40 ms, that is, when the first audio data with a playback duration of more than 40 ms is stored in the first buffer, the first audio data in the first buffer is decoded. That is, the SBC encoded audio data is decoded into PCM (pulse code modulation) audio data. Then, the PCM audio data is resampled (if the sampling rate of the SBC encoded audio data received through the classic BT link is 48 Khz, resampling is not required) into the PCM audio data with a sampling rate of 48 Khz which is used as the second audio data. The second audio data is stored into the second buffer. At the same time, the BLE BIG link obtains the second audio data according to the LC3 encoding frame length of 10 ms. That is, the audio data of 480 PCM sampling points in each channel is encoded to generate the third audio data frame with a LC3 encoder, and the third audio data frame is encapsulated as one or more Service Data Unit (SDU). The SDUs of the left and right channels are transmitted in the same BIG protocol data packet (PDU: Protocol Data Unit). Two PDUs are obtained and sent to the BLE audio receiving device (that is, the audio playback device) through the BIG link in every 20 ms isochronous interval and send them. That is, two PDUs corresponding to BN=2.

In order to reduce the delay of audio transmission, the first threshold can be set to a smaller value, such as 40 ms. Due to the randomness or burst caused by the wireless communication interference environment, the received audio data is occasionally delayed too much, resulting in that classic BT audio data is not received for more than 40 ms, and resulting in that the second audio data is not available for LC3 coding at the current isochronous interval. The current frame is processed as the empty data frame or PDU is not transmitted within the current isochronous interval. When the BLE audio receiving device receives the empty data frame or fails to receive the PDU, the BLE audio receiving device uses PLC (packet loss concealment) technology to eliminate the impact caused by packet loss.

In the above first example, packet loss is handled by PLC at the receiving end to eliminate the audio jam problem. In this way, there is no need to buffer too much audio data in the forwarding link, so as to reduce the delay. It is worth noting that the isochronous interval here can also be 10 ms, 30 ms, or even 15 ms. The first threshold can also be set as other parameters satisfying the system communication delay. Generally, the first threshold may be greater than the isochronous interval.

In one embodiment, when the audio data cannot be obtained from the second buffer, the PDU is not transmitted in the transmission time slot of the current isochronous interval. When the audio data is obtained and the number satisfies the transmission threshold, the PDU is formed based on the valid audio data frame and then is transmitted. For example, when the transmission threshold is set to 1, one valid audio data frame is encapsulated in one PDU, and when the transmission threshold is greater than 1, multiple audio data frames can be encapsulated into one PDU.

In one embodiment, when the audio data cannot be obtained from the second buffer, an empty data frame can also be formed and stored in the third buffer, and the third buffer also stores the valid audio data frame formed when the audio data can be obtained. After the number of data frames stored in the third buffer reaches the transmission threshold, the data frames stored in the third buffer are packaged into one PDU transmitted within the current isochronous interval. That is, at this time, regardless of whether the audio data can be obtained from the second buffer or not, the PDU are transmitted.

If the third audio data frame encoded in the current isochronous interval according to the BLE Audio coding format is the audio data frame that should have been transmitted in one or more previous isochronous intervals (for example, the third audio data frame $p_t$ obtained at the isochronous interval t should be sent at time t−1), the acquired third audio data frame currently encoded in the BLE audio coding format is discarded and the second audio data is acquired again.

In order to further understand the audio forwarding method provided in the present invention, the audio forwarding method is further described below with a second example. In the second example, the first communication link is the classic BT link, the second communication link is the BLE CIG link, and the dual-mode RF transceiver of the audio forwarding device provides a classic BT transceiver function and a BLE transceiver function by sharing the RF transceiver unit.

The classic BT sound source device is used as the master device of the first communication link, and the audio forwarding device is used as the slave device in the first communication link. The audio forwarding device is used as the master device of the second communication link, and the audio playback device is used as the slave device in the second communication link. The classic BT link adopts a Sub-Band Coding (SBC), a sampling rate of 44.1 kHz, and a stereo coding rate of 328 kbps. In the BLE CIG link, a number of CIS (Num_CIS) is 1, a sampling rate is 48 kHz, a low complexity communication codec (LC3) is used, a mono audio coding rate is 96 kbps, a stereo coding rate is 192 kbps. The LC3 encoding interval of the BLE CIG is 10 ms, and the left and right channels are placed in the same Service Data Unit (SDU) with a size of 240 bytes.

Figure 7:
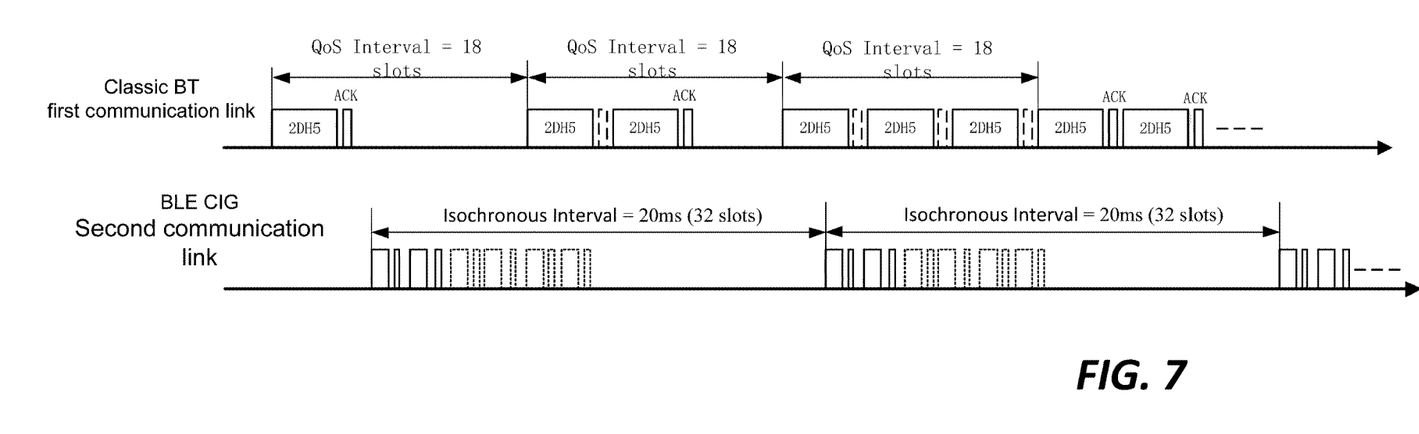
FIG. 7 is a schematic time slot diagram of first and second communication link according to another embodiment of the present invention.

As shown in FIG. 7, it is a time slot structure of the classic BT link and the BLE CIG link. The classic BT link uses a 2DH5 packet type to transmit SBC-encoded audio data, and the QoS Interval is 18 time slots, that is, 11.25 ms. Each 2DH5 block in the first communication link represents one or more audio data packets transmitted by the classic BT sound source device. These audio data packets contain the first audio data. A small bar after each 2DH5 block represents a confirmation packet replied by the audio forwarding device. The solid small bar indicates that the audio forwarding device has replied to the confirmation packet, and the dotted small bar indicates that the audio forwarding device does not receive the audio data packet of the classic BT link and does not reply the confirmation packet due to the time slot conflict when the audio forwarding device receives the first audio data. In the second communication link, namely the BLE CIG link, the rate is 2 Mbps, the isochronous interval is 20 ms, a number of Sub-Events (NSE) is 6, and a burst number (BN) is 2, and a flush time (FT) is 1.

As shown in FIG. 7, there are a total of 6 audio packet transmission opportunities in one isochronous interval of the BLE CIG link. The wide solid block in the BLE CIG link represents the audio data packet when BN is 2, that is, the audio forwarding device sends the audio data packet at least twice. The narrow solid block represents the confirmation packet replied by the audio playback device for the received audio data packet. The dotted line represents retransmission time slots, that is, when the audio forwarding device does not receive the confirmation packet from the BLE audio playback device, the audio forwarding device retransmits the audio data packets in the current isochronous interval. As shown in FIG. 7, since a time division multiplexing method is used to share the RF transceiver unit, the transmission and receiving time slot of the BLE link will conflict with the transmission and receiving time slot of the classic BT link, which results in the audio data packet transmitted by the classic BT sound source device through the first communication link cannot be received by the audio forwarding device in time, and results in a delay in the reception of the first audio data. In addition, the audio forwarding device may delay the reception of audio packets in the classic BT link due to interference in the communication environment.

With reference to the audio forwarding process shown in FIG. 2, the audio forwarding device establishes a classic BT link with the classic BT sound source device, and establishes a BLE CIG link with NUM_CIS of 1 with the BLE audio playback device. The first audio data encoded by the classic BT SBC with a sampling rate of 44.1 kHz (or 48 kHz) is received through the classic BT link and stored in the first buffer. When the first audio data in the first buffer reaches the first threshold, for example, the first threshold is 40 ms, that is, when the first audio data with a playback duration of more than 40 ms is stored in the first buffer, the first audio data in the first buffer is decoded. That is, the SBC encoded audio data is decoded into PCM (pulse code modulation) audio data. Then, the PCM audio data is resampled (if the sampling rate of the SBC encoded audio data received through the classic BT link is 48 Khz, resampling is not required) into the PCM audio data with a sampling rate of 48 Khz which is used as the second audio data. The second audio data is stored into the second buffer. At the same time, the BLE CIG link obtains the second audio data according to the LC3 encoding frame length of 10 ms. That is, the audio data of 480 PCM sampling points in each channel is encoded to generate the third audio data frame with a LC3 encoder, and the third audio data frame is encapsulated as one or more Service Data Units. The SDUs of the left and right channels are transmitted in the same CIG protocol data packet (PDU: Protocol Data Unit). Two PDUs are obtained and sent to the BLE audio receiving device (that is, the audio playback device) through the CIG link in every 20 ms isochronous interval and send them. That is, two PDUs corresponding to BN=2.

In order to reduce the delay of audio transmission, the first threshold can be set to a smaller value, such as 40 ms. Due to the randomness or burst caused by the wireless communication interference environment, the received audio data is occasionally delayed too much, resulting in that the classic BT audio data is not received for more than 40 ms, and resulting in that the second audio data is not available for LC3 coding at the current isochronous interval. The current frame is processed as the empty data frame or PDU is not transmitted within the current isochronous interval.

When the BLE audio receiving device receives the empty data frame or fails to receive the PDU, the BLE audio receiving device uses PLC (packet loss concealment) technology to eliminate the impact caused by packet loss. If the third audio data frame encoded in the current isochronous interval according to the BLE audio coding format is the audio data frame that should have been transmitted in one or more previous isochronous intervals (for example, the third audio data frame $p_t$ obtained at the isochronous interval t should be sent at time t−1), the acquired third audio data frame currently encoded in the BLE audio coding format is discarded and the second audio data is acquired again.

Figure 8:
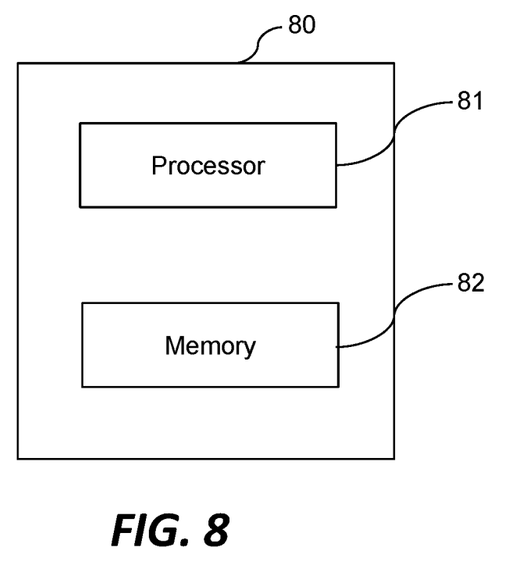
FIG. 8 is a schematic structural diagram of an electronic device according to one embodiment of the present invention.

FIG. 8 is a schematic structural diagram of an electronic device according to one embodiment of the present invention. Referring to FIG. 8, the electronic device 80 comprises a processor 81, a memory 82, and a program stored in the memory 82. The program is executed by the processor 81 to cause the processor to perform the above-mentioned audio data forwarding method. In order to avoid repetition, details are not repeated here.

A computer-readable storage medium storing a program executed by a processor is provided according to one embodiment of the present invention. The program is executed by the processor to cause the processor to perform the above-mentioned audio data forwarding method. In order to avoid repetition, details are not repeated here. The computer-readable storage medium can be, for example, read only memory (ROM), random access memory (RAM), magnetic disc or optical disc.

Those skilled in the art should be aware that the embodiments of this application may be methods, systems, or computer program products. Accordingly, the present invention may take the form of a complete hardware embodiment, a complete software embodiment, or an embodiment in conjunction with software and hardware aspects. Furthermore, the present invention may take the form of a computer program product implemented on one or more computer-available storage media (comprising, but not limited to, disk memory, CD-ROM, optical memory, etc.) containing computer-available program code.

The present invention is described with reference to methods, equipment (systems), and flow charts and/or block diagrams of computer program products according to the embodiment of the present invention. It should be understood that each flow and/or block in a flowchart and/or block diagram, as well as the combination of flow and/or block in a flowchart and/or block diagram, can be implemented by computer program instructions. These computer program instructions may be provided to a processor of a general purpose computer, a dedicated computer, an embedded processor, or other programmable data processing device to produce a machine such that instructions executed by a processor of a computer or other programmable data processing device produce instructions for implementing a flow chart or more. A device for processes and/or block diagrams or functions specified in a box or multiple boxes.

These computer program instructions may also be stored in a computer-readable memory that may guide a computer or other programmable data processing device to work in a particular way, such that the instructions stored in the computer-readable memory generate a manufacturer comprising an instruction device that is implemented in a flow chart one or more processes. Process and/or block diagram, a box or function specified in multiple boxes.

These computer program instructions may also be loaded on a computer or other programmable data processing device such that a series of operational steps are performed on a computer or other programmable device to produce computer-implemented processing, thereby providing instructions executed on a computer or other programmable device for implementing a flow chart. The steps of a process or multiple processes and/or block diagrams, or functions specified in a box.

Although preferred embodiments of the present invention have been described, additional changes and modifications to these embodiments may be made once the basic creative concepts are known to those skilled in the art. The appended claims are therefore intended to be interpreted to comprise preferred embodiments and all changes and modifications falling within the scope of this application. Obviously, a person skilled in the art may make various changes and variations to the application without departing from the spirit and scope of the application. Thus, if these modifications and variations of this application fall within the scope of the claims and their equivalent technologies, the application is also intended to comprise these changes and variations.

I claim:

1. An audio forwarding method, comprising:
    establishing a first communication link with a sound source device based on a first wireless communication protocol;
    establishing a second communication link with an audio playback device based on a second wireless communication protocol;
    receiving first audio data from the sound source device through the first communication link;
    processing the first audio data to generate second audio data, wherein the second audio data is stored in a second buffer; and
    transmitting the second audio data to the audio playback device through the second communication link, wherein the second audio data in the second buffer is acquired according to a predetermined encoding frame length, a current frame is processed as an empty data frame if the second audio data in the second buffer is not successfully acquired, and an audio data packet containing the empty data frame is transmitted or not transmitted to the audio playback device through the second communication link within a current transmission time.

2. The audio forwarding method according to claim 1, wherein said transmitting the second audio data to the audio playback device through the second communication link comprises:
    acquiring the second audio data in the second buffer according to the predetermined encoding frame length, and encoding the acquired second audio data according to a predetermined coding format to obtain a third audio data frame if the second audio data in the second buffer is successfully acquired; and
    encapsulating the third audio data frame and/or the empty data frame into the audio data packet based on the second wireless communication protocol.

3. The audio forwarding method according to claim 2, wherein
    the audio data packet is transmitted to the audio playback device through the second communication link within the current transmission time; or
    the audio data packet is transmitted to the audio playback device through the second communication link within the current transmission time when the audio data packet does not contain the empty data frame, and the audio data packet is not transmitted within the current transmission time when the audio data packet contains the empty data frame.

4. The audio forwarding method according to claim 2, wherein, after the encoding the acquired second audio data according to the predetermined coding format to obtain the third audio data frame if the second audio data in the second buffer is successfully acquired, the audio forwarding method comprises: discarding the third audio data frame if the third audio data frame is the audio data frame that has missed the transmission time.

5. The audio forwarding method according to claim 2, wherein the encapsulating the third audio data frame and/or the empty data frame into the audio data packet based on the second wireless communication protocol comprises: storing the empty data frame and/or the third audio data frame in the third buffer, and encapsulating the data frames in the third buffer into the audio data packet when the number of data frames in the third buffer meets a transmission threshold.

6. The audio forwarding method according to claim 1, wherein said processing the first audio data to generate a second audio data comprises:
receiving the first audio data through the first communication link and storing the first audio data in a first buffer; and
processing the first audio data stored in the first buffer to generate the second audio data when the first audio data in the first buffer reaches a first threshold, and storing the second audio data into the second buffer.

7. The audio forwarding method according to claim 6, wherein said processing the first audio data stored in the first buffer to generate the second audio data comprises: decoding and/or resampling the first audio data.

8. The audio forwarding method according to claim 1, wherein the first wireless communication protocol is a wireless communication protocol based on classic Bluetooth communication technology, and the first communication link is a classic Bluetooth wireless communication link;
the second wireless communication protocol is a wireless communication protocol based on Bluetooth low energy communication technology; the second communication link is a Bluetooth low energy broadcast isochronous group link or a Bluetooth low energy connected isochronous group link;
the sound source device and the audio playback device are communicated respectively in a time-sharing manner, wherein the sound source device is communicated and the first audio data is received within transmission and receiving time slots of the first communication link; the audio playback device is communicated within an isochronous interval of the second communication link, and the audio data packet is transmitted in a transmission time slot of the isochronous interval.

9. An audio forwarding device, comprising:
a dual-mode radio frequency transceiver configured for establishing a first communication link with an audio source device based on a first wireless communication protocol, establishing a second communication link with an audio playback device based on a second wireless communication protocol, receiving first audio data from the audio source device through the first communication link;
an audio processing unit configured for processing the first audio data to generate second audio data, storing the second audio data into a second buffer, and acquiring the second audio data in the second buffer according to a predetermined encoding frame length, processing a current frame as an empty data frame if the second audio data in the second buffer is not successfully acquired; and
a baseband data and protocol processor configured for transmitting or not transmitting an audio data packet containing the empty data frame to the audio playback device through the second communication link within a current transmission time.

10. The audio forwarding device according to claim 9, wherein the audio processing unit is further configured for:
acquiring the second audio data in the second buffer according to the predetermined encoding frame length, and encoding the acquired second audio data according to a predetermined coding format to obtain a third audio data frame if the second audio data in the second buffer is successfully acquired;
encapsulating the third audio data frame and/or the empty data frame into the audio data packet based on the second wireless communication protocol;
the baseband data and protocol processor is further configured for:
controlling the dual-mode radio frequency transceiver to transmit the audio data packet to the audio playback device through the second communication link within the current transmission time; or
controlling the dual-mode radio frequency transceiver to transmit the audio data packet to the audio playback device through the second communication link within the current transmission time when the audio data packet does not contain the empty data frame, and not to transmit the audio data packet within the current transmission time when the audio data packet contains the empty data frame.

11. The audio forwarding device according to claim 10, wherein the audio processing unit is further configured for:
receiving the first audio data through the first communication link and storing the first audio data in a first buffer;
processing the first audio data stored in the first buffer to generate the second audio data when the first audio data in the first buffer reaches a first threshold, and storing the second audio data into the second buffer;
storing the empty data frame and/or the third audio data frame in the third buffer, and encapsulating the data frames in the third buffer into the audio data packet when the number of data frames in the third buffer meets a transmission threshold;
discarding the third audio data frame if the third audio data frame is the audio data frame that has missed the transmission time.

12. The audio forwarding device according to claim 9, wherein the dual-mode RF transceiver is provided with a RF transceiver unit, the audio forwarding device multiplexes the RF transceiver unit, and communicates with the audio source device and the audio playback device through the first communication link and the second communication link respectively in time sharing; or the dual-mode RF transceiver comprises a first communication link transceiver configured for communicating with the sound source device through the first communication link; and a second communication link transceiver configured for communicating with the audio playback device through the second communication link.

13. The audio forwarding device according to claim 9, wherein the first wireless communication protocol is a wireless communication protocol based on classic Bluetooth communication technology, and the first communication link is a classic Bluetooth wireless communication link, the second wireless communication protocol is a wireless communication protocol based on Bluetooth low energy communication technology; the second communication link is a Bluetooth low energy broadcast isochronous group link or a Bluetooth low energy connected isochronous group link.

14. An electronic device, comprising a processor, a memory, and a program stored in the memory and operable on the processor, the program, when executed by the processor, causing the processor to perform:
   establishing a first communication link with a sound source device based on a first wireless communication protocol;
   establishing a second communication link with an audio playback device based on a second wireless communication protocol;
   receiving first audio data from the sound source device through the first communication link;
   processing the first audio data to generate second audio data, and storing the second audio data into a second buffer; and
   transmitting the second audio data to the audio playback device through the second communication link, wherein the second audio data in the second buffer is acquired according to a predetermined encoding frame length, a current frame is processed as an empty data frame if the second audio data in the second buffer is not successfully acquired, and an audio data packet containing the empty data frame is transmitted or not transmitted to the audio playback device through the second communication link within a current transmission time.

* * * * *